(12) United States Patent
Sakaidani et al.

(10) Patent No.: US 12,366,510 B2
(45) Date of Patent: Jul. 22, 2025

(54) BENDING TEST FACILITY AND BENDING TEST METHOD FOR METAL SHEET MATERIAL FOR AUTOMOBILE BODY AND BENDING PERFORMANCE EVALUATION METHOD USING THE BENDING TEST FACILITY

(71) Applicant: JFE STEEL CORPORATION, Tokyo (JP)

(72) Inventors: Tomohiro Sakaidani, Tokyo (JP); Kentaro Sato, Tokyo (JP); Takayuki Futatsuka, Tokyo (JP); Shinsuke Komine, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 311 days.

(21) Appl. No.: 17/801,625

(22) PCT Filed: Feb. 22, 2021

(86) PCT No.: PCT/JP2021/006543
§ 371 (c)(1),
(2) Date: Aug. 23, 2022

(87) PCT Pub. No.: WO2021/172252
PCT Pub. Date: Sep. 2, 2021

(65) Prior Publication Data
US 2023/0105443 A1    Apr. 6, 2023

(30) Foreign Application Priority Data
Feb. 26, 2020   (JP) ................. 2020-030302

(51) Int. Cl.
*G01N 3/04*  (2006.01)
*G01N 3/20*  (2006.01)

(52) U.S. Cl.
CPC ................. *G01N 3/04* (2013.01); *G01N 3/20* (2013.01); *G01N 2203/0023* (2013.01)

(58) Field of Classification Search
CPC .. G01N 3/068; G01N 3/04; G01N 2203/0023; G01N 2203/0282; G01N 2203/0647; G01N 3/20

(Continued)

(56) References Cited

U.S. PATENT DOCUMENTS 5,178,017 A * 1/1993 Dinzburg ................. G01N 3/20
                                                                73/849
5,553,486 A * 9/1996 Bonin ...................... B82Y 35/00
                                                                361/283.4

(Continued)

FOREIGN PATENT DOCUMENTS

| CN | 101846606 A | 9/2010 |
| CN | 203337458 U | 12/2013 |

(Continued)

OTHER PUBLICATIONS

Apr. 12, 2024 Chinese Office Action issued in Chinese Patent Application No. 202180016266.3.

(Continued)

*Primary Examiner* — John Fitzgerald
(74) *Attorney, Agent, or Firm* — Oliff PLC (57) ABSTRACT

A strain state of a bending outside surface of a test specimen is photographed by use of a camera without falling out of focus during a bending test. A bending test facility for a metal sheet material for an automobile body includes a supporting member that supports two supported portions of a flat test specimen formed of the metal sheet material for an automobile body, a punch for performing a bending test in which an area between the two supported portions of the test specimen is pressed from an opposite side to the supporting (Continued)

member so that the test specimen is bent to be deformed, and a camera for photographing, from the side of the supporting member, a bending outside surface of the test specimen during the bending test using the punch, with relative positions of the punch and the camera during the bending test being fixed.

18 Claims, 6 Drawing Sheets

(58) Field of Classification Search
USPC .......................................... 73/849, 851, 852
See application file for complete search history.

(56) References Cited

U.S. PATENT DOCUMENTS

| | | | | |
|---|---|---|---|---|
| 6,860,156 | B1* | 3/2005 | Cavallaro | G01N 3/08 73/818 |
| 7,036,364 | B2* | 5/2006 | Swillo | H04L 9/0852 73/849 |
| 7,162,069 | B2* | 1/2007 | Theobald | G01N 3/20 356/600 |
| 7,204,160 | B1* | 4/2007 | Sadegh | G01N 3/10 73/862.041 |
| 10,168,238 | B2* | 1/2019 | Belzacq | G01N 3/068 |
| 11,906,482 | B2* | 2/2024 | Agnello | G01N 3/068 |
| 2009/0141287 | A1* | 6/2009 | Sato | G06T 7/521 356/610 |
| 2011/0314906 | A1 | 12/2011 | Shuaib et al. | |
| 2013/0152706 | A1 | 6/2013 | Nam et al. | |
| 2015/0292999 | A1* | 10/2015 | Futatsuka | G01N 3/42 73/81 |
| 2017/0191916 | A1 | 7/2017 | Aegerter et al. | |
| 2022/0018747 | A1 | 1/2022 | Sato et al. | |

FOREIGN PATENT DOCUMENTS

| | | |
|---|---|---|
| CN | 105259048 A | 1/2016 |
| CN | 108760503 A | 11/2018 |
| CN | 109870367 A | 6/2019 |
| CN | 110186631 A | 8/2019 |
| CN | 210665329 U | 6/2020 |
| DE | 10 2004 041 029 A1 | 3/2005 |
| EP | 3 901 609 A1 | 10/2021 |
| JP | H09-89711 A | 4/1997 |
| JP | H10-082726 A | 3/1998 |
| JP | H10-318896 A | 12/1998 |
| JP | 2003-270109 A | 9/2003 |
| JP | 2003-307477 A | 10/2003 |
| JP | 2009-068919 A | 4/2009 |
| JP | 2009-145138 A | 7/2009 |
| JP | 2014-102131 A | 6/2014 |
| JP | 2014-190764 A | 10/2014 |
| JP | 2016-003987 A | 1/2016 |
| JP | 2016-080464 A | 5/2016 |
| JP | 2016-150381 A | 8/2016 |
| KR | 10-2016-0052145 A | 5/2016 |
| KR | 10-2017-0086112 A | 7/2017 |
| WO | 2020/129903 A1 | 6/2020 |

OTHER PUBLICATIONS

Jun. 29, 2023 Extended European Search Report issued in European Patent Application No. 21761131.8.
Pascal Dietsch et al., "Methodology to assess fracture during crash simulation: fracture strain criteria and their calibration", Metallurgical Research & Technology, 114, 607, (2017), pp. 1-9.
May 11, 2021 International Search Report issued in International Patent Application No. PCT/JP2021/006543.
Aug. 2, 2022 Office Action issued in Japanese Patent Application No. 2020-030302.
Aug. 30, 2024 Chinese Office Action issued in Chinese Patent Application No. 202180016266.3.
Aug. 30, 2024 Translated Search Report issued in Chinese Patent Application No. 202180016266.3.
Sep. 27, 2024 Office Action issued in Korean Patent Application No. 10-2022-7029257.

* cited by examiner

BENDING TEST FACILITY AND BENDING TEST METHOD FOR METAL SHEET MATERIAL FOR AUTOMOBILE BODY AND BENDING PERFORMANCE EVALUATION METHOD USING THE BENDING TEST FACILITY

TECHNICAL FIELD

The present invention relates to a bending test facility and a bending test method for a metal sheet material for an automobile body and a bending performance evaluation method using the bending test facility.

BACKGROUND ART

With the recent increase in use of high-strength steel sheets as a material for an automobile body to achieve a weight reduction of an automobile while maintaining collision performance thereof, an increase in strength of the material leads to a decrease in ductility of the material, resulting in a higher risk of the occurrence of fracture in a collision.

In particular, an energy absorbing member that is arranged at each of a front and a rear of an automobile body is desired to be plastically deformed in a collision so as to absorb collision energy. When axially collapsed, however, the energy absorbing member often suffers from local formation of large strain, which leads to the occurrence of fracture. When such fracture develops into a large crack to cause disintegration of the member, there may occur a substantial decrease in collision load, rendering energy absorbing performance unstable, and the unstable energy absorbing performance has been a serious hindrance to the use of a high-strength steel sheet in an automobile body.

It is known that the above-described fracture due to axial collapse deformation cannot be evaluated using an index such as uniform elongation or local elongation obtained by a tension test, and for determination of presence or absence of the fracture, various material test methods have conventionally been proposed.

For example, a VDA 238-100 bending test method standardized by the German Association of the Automobile Industry Standard and Rules (Verband der Automobilindustrie: VDA) proposes a method in which a sheet material is laid over two rollers arranged side by side and is pressed from above by use of a sharp punch so as to be bent, and a limit bending radius of the sheet material is evaluated. It is reported that the limit bending radius obtained by this method corresponds to local deformation that might occur in a collision.

Further, Patent Literature 1 proposes to improve the above-described bending test method pursuant to the VDA standard so that resistance of a part to a crack in a collision is predicted by evaluating, from a load stroke curve obtained by an experiment, a status of the occurrence of cracking after the limit bending radius has been reached.

The above-described prior-art evaluation test can evaluate the superiority or inferiority in terms of a fracture resistance property at the occurrence of axial collapse for each material. This evaluation test also involves not only measurement of a punch load and a stroke in a bending test but also observation of a strain state of the material during the test and thus can provide, in addition to information related to a macro fracture phenomenon, information extremely useful in developing materials excellent in fracture resistance property, such as information on how strain develops into local fracture or information on critical fracture strain.

CITATION LIST

Patent Literature

Patent Literature 1: JP-A-2016-080464

SUMMARY OF INVENTION

Technical Problem

However, since a bending test is typically performed while a punch is operated, a strain state of a bending outside surface can hardly be photographed without a camera going out of focus during the test. Furthermore, when the bending test pursuant to the VDA standard is used to perform an evaluation, in order to photograph a bending outside surface by use of a camera, it is required that the surface of a sample be photographed at a high resolution through a gap between the two rollers, in which case a luminosity and a field of view of the sample can hardly be secured.

In view of the above, it is an object of the present invention to provide a bending test facility and a bending test method for a metal sheet material for an automobile body and a bending performance evaluation method using the bending test facility, which advantageously solve the above-described problems with the conventional test methods.

Solution to Problem

A bending test facility for a metal sheet material for an automobile body according to the present invention that achieves the above-described object is characterized by including a supporting member that supports two supported portions of a flat test specimen formed of the metal sheet material for an automobile body;

a punch for performing a bending test in which an area between the two supported portions of the test specimen is pressed from the opposite side to the supporting member so that the test specimen is bent to be deformed; and a camera for photographing, from the side of the supporting member, a bending outside surface of the test specimen during the bending test using the punch, wherein relative positions of the punch and the camera during the bending test are fixed.

Furthermore, a bending test method for a metal sheet material for an automobile body according to the present invention that achieves the above-described object is characterized by including:

supporting two supported portions of a flat test specimen formed of the metal sheet material for an automobile body with a supporting member; and performing a bending test in which an area between the two supported portions of the test specimen is pressed by use of a punch from the opposite side to the supporting member so that the test specimen is bent to be deformed, wherein during the bending test, a bending outside surface of the test specimen is photographed from the side of the supporting member by use of a camera having a fixed relative positional relationship with the punch.

Moreover, a bending performance evaluation method for a metal sheet material for an automobile body according to the present invention is characterized by including, during a bending test using the bending test facility, photographing an image of a bending outside of the test specimen by use of the camera, obtaining, from the image, information on a distribution of strain on the bending outside of the test specimen, a change in the distribution, the occurrence and development of a crack thereon, and/or a distribution of cracks thereon, and evaluating bending performance of the test specimen based on the information.

Advantageous Effects of Invention

According to the bending test facility and the bending test method for a metal sheet material for an automobile body of the present invention, two supported portions of a flat test specimen formed of the metal sheet material for an automobile body are supported with a supporting member, and a bending test is performed in which an area between the two supported portions of the test specimen is pressed by use of a punch from the opposite side to the supporting member so that the test specimen is bent to be deformed, during which a bending outside surface of the test specimen is photographed from the side of the supporting member by use of a camera having a fixed relative positional relationship with the punch. Thus, a strain state of the bending outside surface of the test specimen can be photographed without falling out of focus during the test.

Further, according to the bending performance evaluation method of the present invention, bending performance of a test specimen is evaluated based on information on a distribution of strain on a bending outside of the test specimen, a change in the distribution, the occurrence and development of a crack thereon, and/or a distribution of cracks thereon obtained from an image of the bending outside of the test specimen photographed by use of the camera during the bending test using the bending test facility. Thus, it is possible to obtain, in addition to information related to a macro fracture phenomenon, information extremely useful in developing materials excellent in fracture resistance property, such as information on how strain develops into local fracture or information on critical fracture strain.

In the bending test facility and the bending test method according to the present invention, the supporting member supporting the two supported portions of the test specimen may be formed of two rollers arranged in parallel and horizontally at a distance from each other. With this configuration, it is possible to implement the bending test method prescribed in the VDA 238-100 standard.

Further, in the bending test facility and the bending test method according to the present invention, at least one of the two rollers may have, while including a rotary shaft portion, a partially missing circular cross section as viewed from a rotary shaft direction thereof. With this configuration, it is possible to photograph, by use of the camera, the bending outside surface of the test specimen from the side of the supporting member while securing a field of view and a luminosity through an omitted part(s) of the roller(s) and thus to obtain a clearer image.

Moreover, the bending test facility and the bending test method according to the present invention may have a configuration including a tester that includes a movable portion and an immovable portion and advances or retracts the movable portion relative to the immovable portion, in which the punch and the camera are installed in the immovable portion, and the supporting member is installed in the movable portion. With this configuration, the punch and the camera are not affected by vibrations or the like caused by movement of the movable portion with respect to the immovable portion during a bending test, and thus it is possible to more reliably prevent the camera from going out of focus.

Moreover, in the bending performance evaluation method according to the present invention, the information may be obtained by digital image correlation (DIC). With this configuration, a more detailed bending performance evaluation can be performed.

DESCRIPTION OF EMBODIMENTS

An embodiment of the present invention will be described with reference to the appended drawings. Note that FIG. 1 is a perspective view showing a bending test facility for a metal sheet material for an automobile body according to the embodiment of the present invention and a bending test method for a metal sheet material for an automobile body according to the embodiment of the present invention, which uses the bending test facility.

Figure 1:
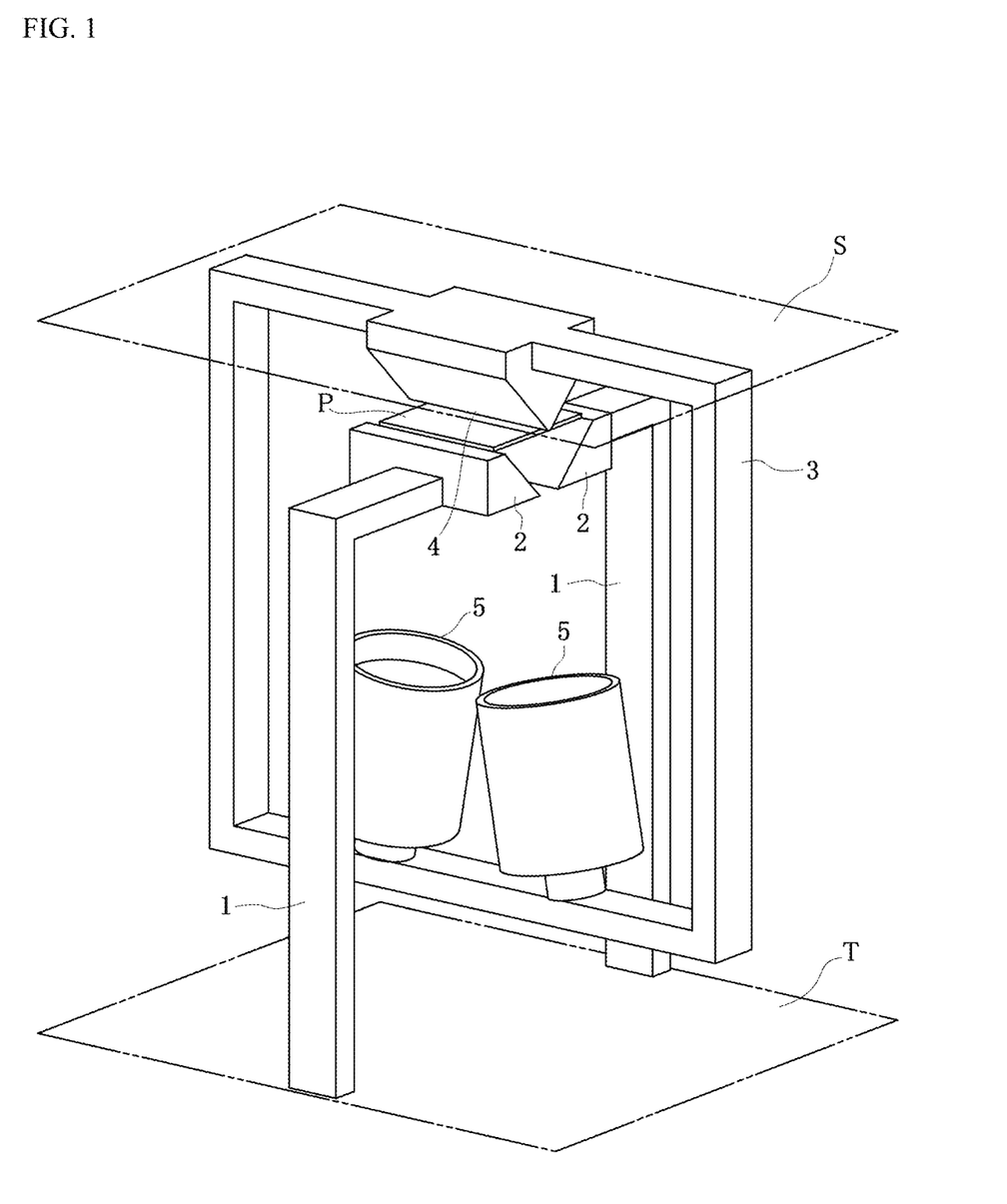
FIG. 1 is a perspective view showing a bending test facility for a metal sheet material for an automobile body according to an embodiment of the present invention and a bending test method for a metal sheet material for an automobile body according to the embodiment of the present invention, which uses the bending test facility.

The bending test facility for a metal sheet material for an automobile body according to this embodiment includes
two dies 2 that are fixed via a support frame 1 with a gap provided therebetween to a fixed table T as an immovable portion, a mounting plane of which is shown by a virtual line in FIG. 1, of a tester such as, for example, an Amsler-type tester that measures, while applying a load to an object to be tested by use of a slide configured to be displaced in such a direction as to approach or separate from a fixed table, a magnitude of the load and a displacement amount of the slide and that function as a supporting member that supports two supported portions in the vicinity of both ends of a flat and rectangular test specimen P formed of a metal sheet material for an automobile body, a punch 4 that has a V-shaped cross section and is fixed via a connection frame 3 to a slide S as a movable portion of the above-described tester, a mounting plane of which is shown by a virtual line in FIG. 1, and a camera 5 that has a relative positional relation to the punch 4 by the connection frame 3 and includes a lens directed to the gap between the two dies 2.

Furthermore, the bending test method for a metal sheet material for an automobile body according to this embodiment includes performing a bending test using the bending test facility according to the foregoing embodiment, in which the slide S is displaced in such a direction as to approach the fixed table T of the above-described tester to cause the punch 4 to press a center between the above-described two supported portions of the test specimen P from the opposite side to the dies 2, namely, downward from above in FIG. 1, so that the test specimen P is pressed into a V-shaped gap between the two dies 2 and bent to be deformed in a V shape, and photographing a bending outside surface of the test specimen P during the bending test, which faces downward in FIG. 1, by use of the camera 5 from below through the gap between the two dies 2 below the test specimen P.

According to the bending test facility and the bending test method for a metal sheet material for an automobile body of such an embodiment, during the bending test of the test specimen P, the bending outside surface of the test specimen P is photographed from the side of the dies 2 by use of the camera 5 having a fixed relative positional relationship with the punch 4, and thus a strain state of the bending outside surface of the test specimen P can be photographed without falling out of focus during the test.

Further, an embodiment of the bending performance evaluation method according to the present invention includes evaluating bending performance of the test specimen P by inputting, to an ordinary computer, an image of a strain state of the bending outside surface of the test specimen P photographed from the side of the dies 2 during the bending test of the test specimen P using the bending test method according to the foregoing embodiment and by analyzing, with an evaluation program executed by the computer, such as the digital image correlation (DIC), at least one of different types of information including a distribution of strain on the bending outside of the test specimen P, a change in the distribution, the occurrence and development of a crack thereon, and a distribution of cracks thereon. According to the bending performance evaluation method of this embodiment, it is possible to obtain, in addition to information related to a macro fracture phenomenon, information extremely useful in developing materials excellent in fracture resistance property, such as information on how strain develops into local fracture or information on critical fracture strain.

Figure 2:
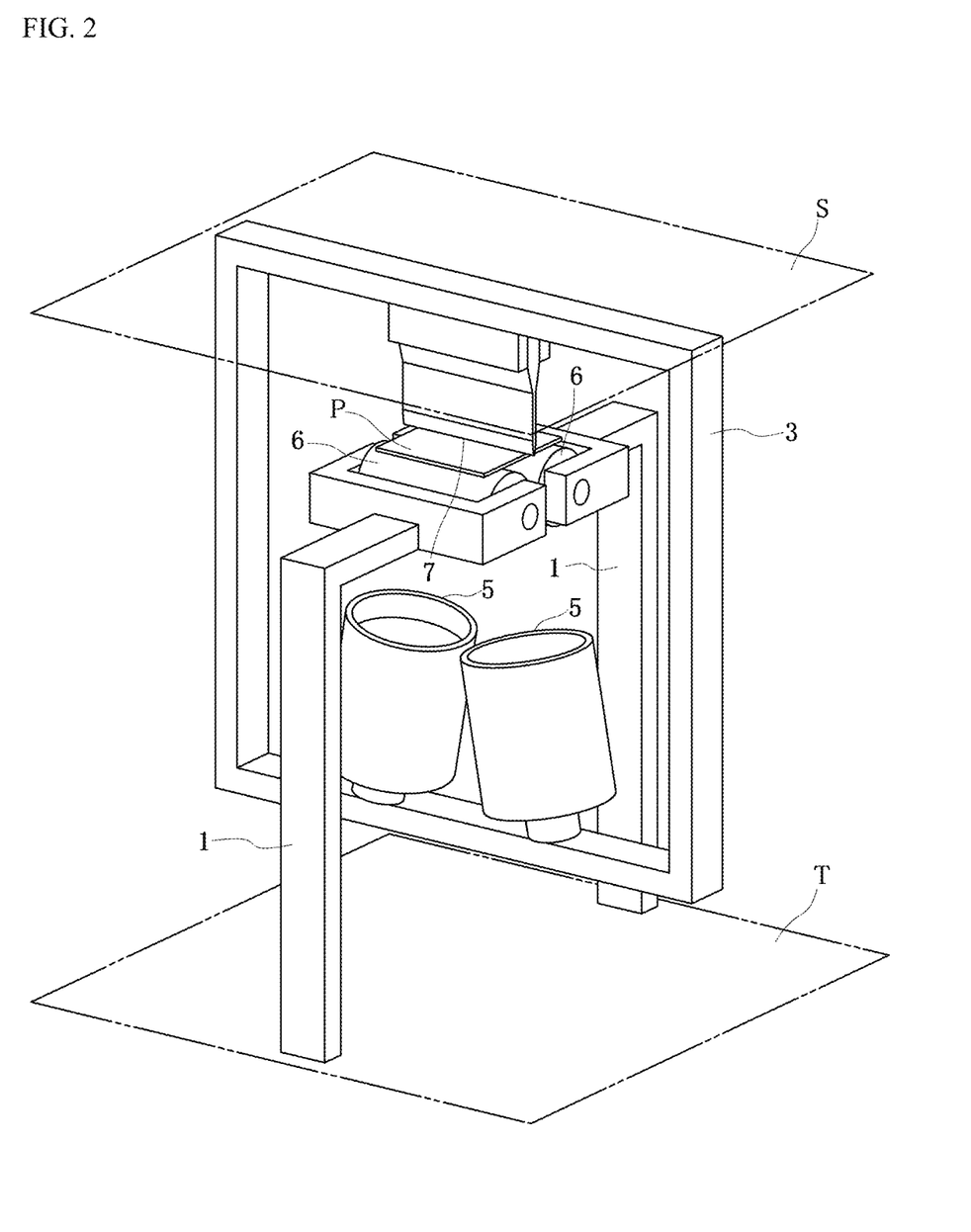
FIG. 2 is a perspective view showing a bending test facility for a metal sheet material for an automobile body according to another embodiment of the present invention and a bending test method for a metal sheet material for an automobile body according to the other embodiment of the present invention, which uses the bending test facility.

FIG. 2 is a perspective view showing a bending test facility for a metal sheet material for an automobile body according to another embodiment of the present invention and a bending test method for a metal sheet material for an automobile body according to the other embodiment of the present invention, which uses the bending test facility.

The bending test facility for a metal sheet material for an automobile body according to this embodiment includes:

two rollers 6 that are arranged in parallel and horizontally with a gap provided therebetween and rotatably and axially supported via a support frame 1 to a fixed table T as an immovable portion of the above-described tester, a mounting plane of which is shown by a virtual line in FIG. 2, and function as a supporting member that supports two supported portions of a flat and rectangular test specimen P in vicinities of both ends thereof, which is formed of a metal sheet material for an automobile body;

a sharply edged punch 7 that is fixed via a connection frame 3 to a slide S as a movable portion of the above-described tester, a mounting plane of which is shown by another virtual line in FIG. 2, and is used to perform a bending test in which the punch 7 presses a center between the above-described two supported portions of the test specimen P from a side opposite to the rollers 6, namely, downward from above in FIG. 2, so that the test specimen P is bent at an acute angle to be deformed; and a camera 5 that has a fixed relative positional relationship with the punch 7 by the connection frame 3 and includes a lens directed to the gap between the two rollers 6.

Furthermore, the bending test method for a metal sheet material for an automobile body according to this embodiment includes performing a bending test, using the bending test facility according to the foregoing embodiment, in which the slide S is displaced in such a direction as to approach the fixed table T of the above-described tester to cause the punch 7 to press the center between the above-described two supported portions of the test specimen P from the side opposite to the side of the rollers 6, namely, downward from above in FIG. 2, so that the test specimen P is pressed into the gap between the two rollers 6 and bent at an acute angle to be deformed, and photographing a bending outside surface of the test specimen P during the bending test, which faces downward in FIG. 2, by use of the camera 5 from below through the gap between the two rollers 6 below the test specimen P.

According to the bending test facility and the bending test method for a metal sheet material for an automobile body of such an embodiment, during the bending test of the test specimen P, the bending outside surface of the test specimen P is photographed from the side of the rollers 6 by use of the camera 5 having a fixed relative positional relationship with the punch 7, and thus while, for example, the VDA 238-100 bending test is performed, a strain state of the bending outside surface of the test specimen P can be photographed without falling out of focus during the test.

Further, another embodiment of the bending performance evaluation method according to the present invention includes evaluating bending performance of the test specimen P by inputting, to an ordinary computer, an image of a strain state of the bending outside surface of the test specimen P photographed from the side of the rollers 6 during the bending test of the test specimen P using the bending test method according to the foregoing embodiment and by analyzing, with an evaluation program executed by the computer, such as the digital image correlation (DIC), at least one of different types of information including a distribution of strain on the bending outside of the test specimen P, a change in the distribution, the occurrence and development of a crack thereon, and a distribution of cracks thereon. According to the bending performance evaluation method of this embodiment, in the VDA 238-100 bending test, it is possible to obtain, in addition to information related to a macro fracture phenomenon, information such as on how strain develops into local fracture or on critical fracture strain.

Figure 3:
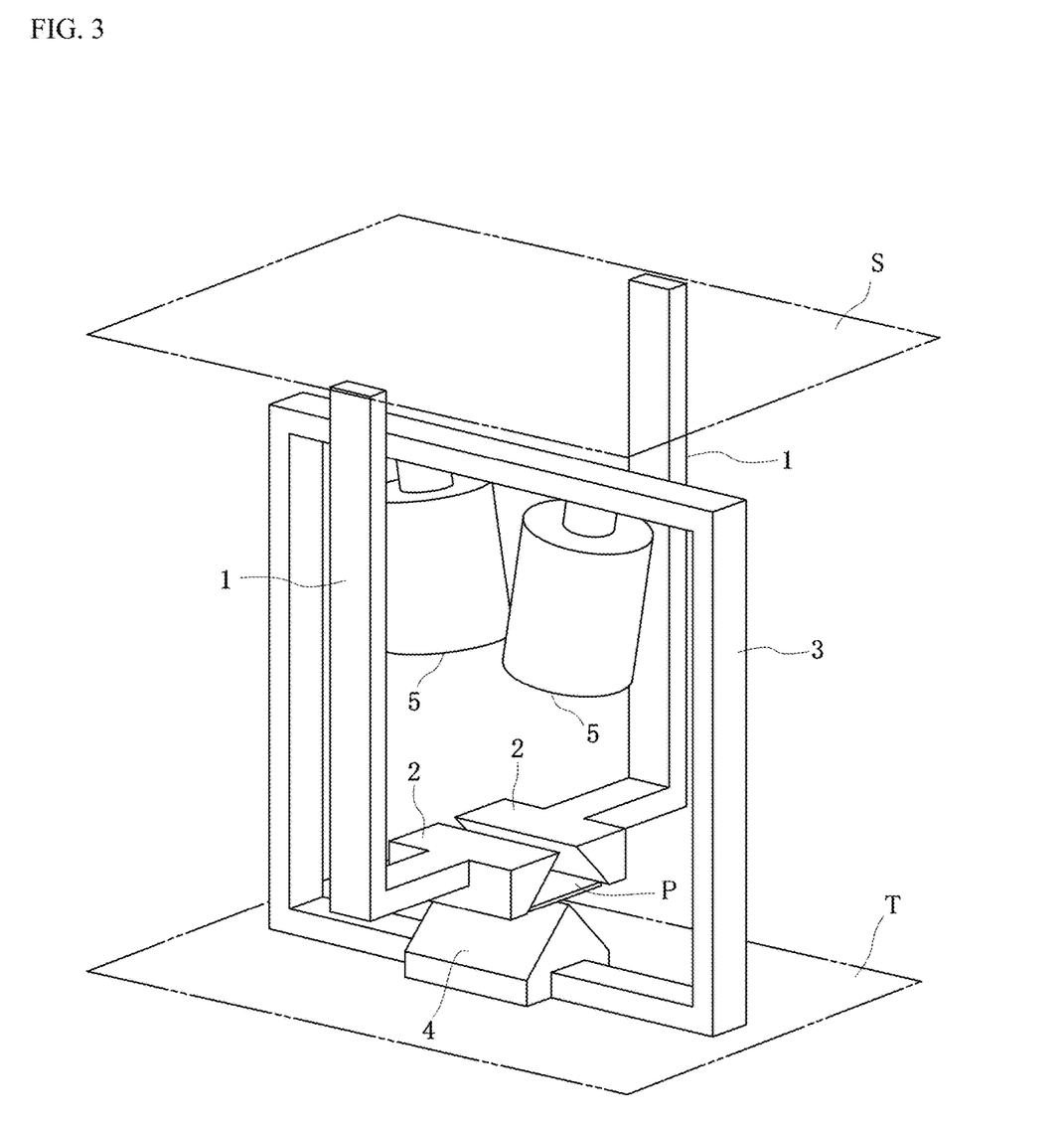
FIG. 3 is a perspective view showing a modification example of the bending test facility for a metal sheet material for an automobile body according to the embodiment shown in FIG. 1 and a modification example of the bending test method for a metal sheet material for an automobile body according to the embodiment shown in FIG. 1, which uses the bending test facility.

FIG. 3 is a perspective view showing a modification example of the bending test facility for a metal sheet material for an automobile body according to the embodiment shown in FIG. 1 and a modification example of the bending test method for a metal sheet material for an automobile body according to the embodiment shown in FIG. 1, which uses the bending test facility.

A bending test facility for a metal sheet material for an automobile body according to this modification example is arranged upside down with respect to the bending test facility according to the embodiment shown in FIG. 1 and has the following configuration. That is, two dies 2 as a supporting member are fixed via a support frame 1 to a slide S as a movable portion of the above-described tester, a mounting plane of which is shown by a virtual line in FIG. 3, with a gap provided therebetween and support, with the aid of unshown sponge or the like, two supported portions of a flat and rectangular test specimen P in vicinities of both ends thereof, which is formed of a metal sheet material for an automobile body. A punch 4 having a V-shaped cross section is fixed via a connection frame 3 to a fixed table T as an immovable portion of the above-described tester, a mounting plane of which is shown by another virtual line in FIG. 3. A camera 5 has a relative positional relationship with the punch 4 fixed by the connection frame 3 and includes a lens directed to a gap between the two dies 2.

Furthermore, a bending test method for a metal sheet material for an automobile body according to this modification example includes, using the bending test facility according to the foregoing modification example, performing a bending test in which the slide S is displaced in such a direction as to approach the fixed table T of the above-described tester to cause the punch 4 to press a center between the above-described two supported portions of the test specimen P from a side opposite to a side of the dies 2, namely, upward from below in FIG. 3, so that the test specimen P is pressed into a V-shaped gap between the two dies 2 and bent to be deformed in a V shape, and photographing a bending outside surface of the test specimen P during the bending test, which faces upward in FIG. 3, by use of the camera 5 from above through the gap between the two dies 2 above the test specimen P.

According to the bending test facility and the bending test method for a metal sheet material for an automobile body of such a modification example, during the bending test of the test specimen P, the bending outside surface of the test specimen P is photographed from the side of the dies 2 by use of the camera 5 having a fixed relative positional relationship with the punch 4, and thus a strain state of the bending outside surface of the test specimen P can be photographed without falling out of focus during the test. Moreover, since the punch 4 and the camera 5 are fixed to the fixed table T as the immovable portion, the punch 4 and the camera 5 can be made less affected by vibrations or the like caused by displacement of the slide S during the bending test, and work to install a fixing jig, wiring, and so on for the punch 4 and the camera 5 can be more facilitated.

Further, a bending performance evaluation method according to the modification example of the embodiment of the present invention includes evaluating bending performance of the test specimen P by inputting, to an ordinary computer, an image of a strain state of the bending outside surface of the test specimen P photographed from the side of the dies 2 during the bending test of the test specimen P using the bending test method according to the modification example shown in FIG. 3 and by analyzing, with an evaluation program executed by the computer, such as the digital image correlation (DIC), at least one of different types of information including a distribution of strain on a bending outside of the test specimen P, a change in the distribution, the occurrence and development of a crack thereon, and a distribution of cracks thereon. According also to the bending performance evaluation method of this embodiment, it is possible to obtain, in addition to information related to a macro fracture phenomenon, information extremely useful in developing materials excellent in fracture resistance property, such as information on how strain develops into local fracture or information on critical fracture strain.

Figure 4:
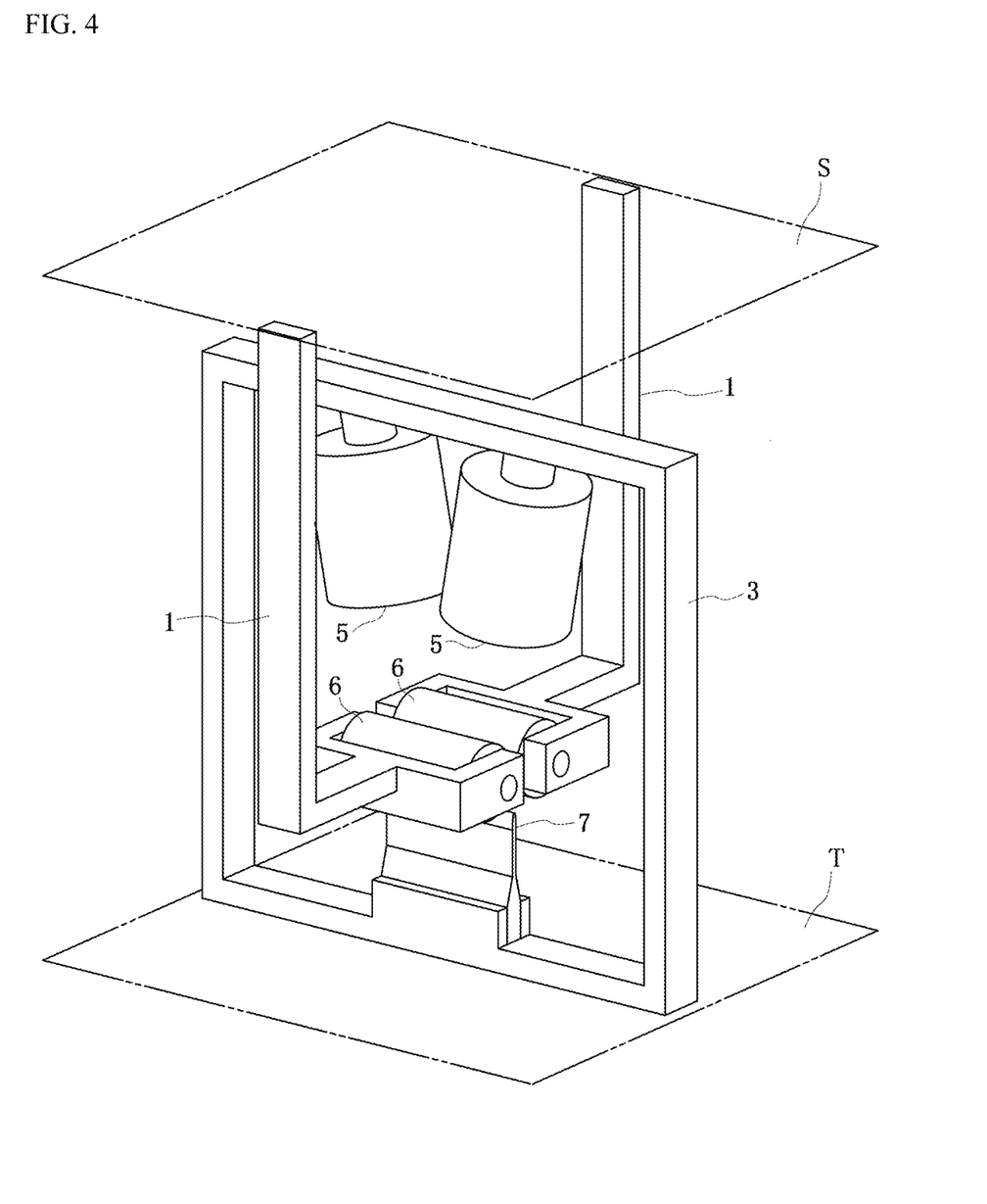
FIG. 4 is a perspective view showing a modification example of the bending test facility for a metal sheet material for an automobile body according to the embodiment shown in FIG. 2 and a modification example of the bending test method for a metal sheet material for an automobile body according to the embodiment shown in FIG. 2, which uses the bending test facility.

FIG. 4 is a perspective view showing a modification example of the bending test facility for a metal sheet material for an automobile body according to the embodiment shown in FIG. 2 and a modification example of the bending test method for a metal sheet material for an automobile body according to the embodiment shown in FIG. 2, which uses the bending test facility.

A bending test facility for a metal sheet material for an automobile body according to this modification example is arranged upside down with respect to the bending test facility according to the embodiment shown in FIG. 2 and has the following configuration. That is, two rollers 6 as a supporting member are arranged in parallel and horizontally with a gap provided therebetween and rotatably and axially supported via a support frame 1 to a slide S as a movable portion of the above-described tester, a mounting plane of which is shown by a virtual line in FIG. 4, and support, with the aid of unshown sponge or the like, two supported portions of a flat and rectangular test specimen P in vicinities of both ends thereof, which is formed of a metal sheet material for an automobile body. A sharply edged punch 7 is fixed via a connection frame 3 to a fixed table T as an immovable portion of the above-described tester, a mounting plane of which is shown by another virtual line in FIG. 4. A camera 5 has a fixed relative positional relationship with the punch 7 by the connection frame 3 and includes a lens directed to a gap between the two rollers 6.

Furthermore, a bending test method for a metal sheet material for an automobile body according to this modification example includes, using the bending test facility according to the foregoing modification example, performing a bending test in which the slide S is displaced in such a direction as to approach the fixed table T of the above-described tester to cause the punch 7 to press a center between the above-described two supported portions of the test specimen P from the opposite side to the rollers 6, namely, upward from below in FIG. 4, so that the test specimen P is pressed into the gap between the two rollers 6 and bent at an acute angle to be deformed, and photographing a bending outside surface of the test specimen P during the bending test, which faces upward in FIG. 4, by use of the camera 5 from above through the gap between the two rollers 6 above the test specimen P.

According also to the bending test facility and the bending test method for a metal sheet material for an automobile body of such a modification example, during the bending test of the test specimen P, the bending outside surface of the test specimen P is photographed from the side of the rollers 6 by use of the camera 5 having a fixed relative positional relationship with the punch 7, and thus while, for example, the VDA 238-100 bending test is performed, a strain state of the bending outside surface of the test specimen P can be photographed without falling out of focus during the test. Moreover, since the punch 7 and the camera 5 are fixed to the fixed table T as the immovable portion, the punch 7 and the camera 5 can be made less affected by vibrations or the like caused by displacement of the slide S during the bending test, and work to install a fixing jig, wiring, and so on for the punch 7 and the camera 5 can be more facilitated.

Further, a bending performance evaluation method according to another modification example of the embodiment of the present invention includes evaluating bending performance of the test specimen P by inputting, to an ordinary computer, an image of a strain state of the bending outside surface of the test specimen P photographed from the side of the rollers 6 during the bending test of the test specimen P using the bending test method according to the modification example shown in FIG. 4 and by analyzing, with an evaluation program executed by the computer, such as the digital image correlation (MC), at least one of different types of information including a distribution of strain on a bending outside of the test specimen P, a change in the distribution, the occurrence and development of a crack thereon, and a distribution of cracks thereon. According also to the bending performance evaluation method according to this modification example, it is possible to obtain, in addition to information related to a macro fracture phenomenon, information extremely useful in developing materials excellent in fracture resistance property, such as information on how strain develops into local fracture or information on critical fracture strain.

Figure 5:
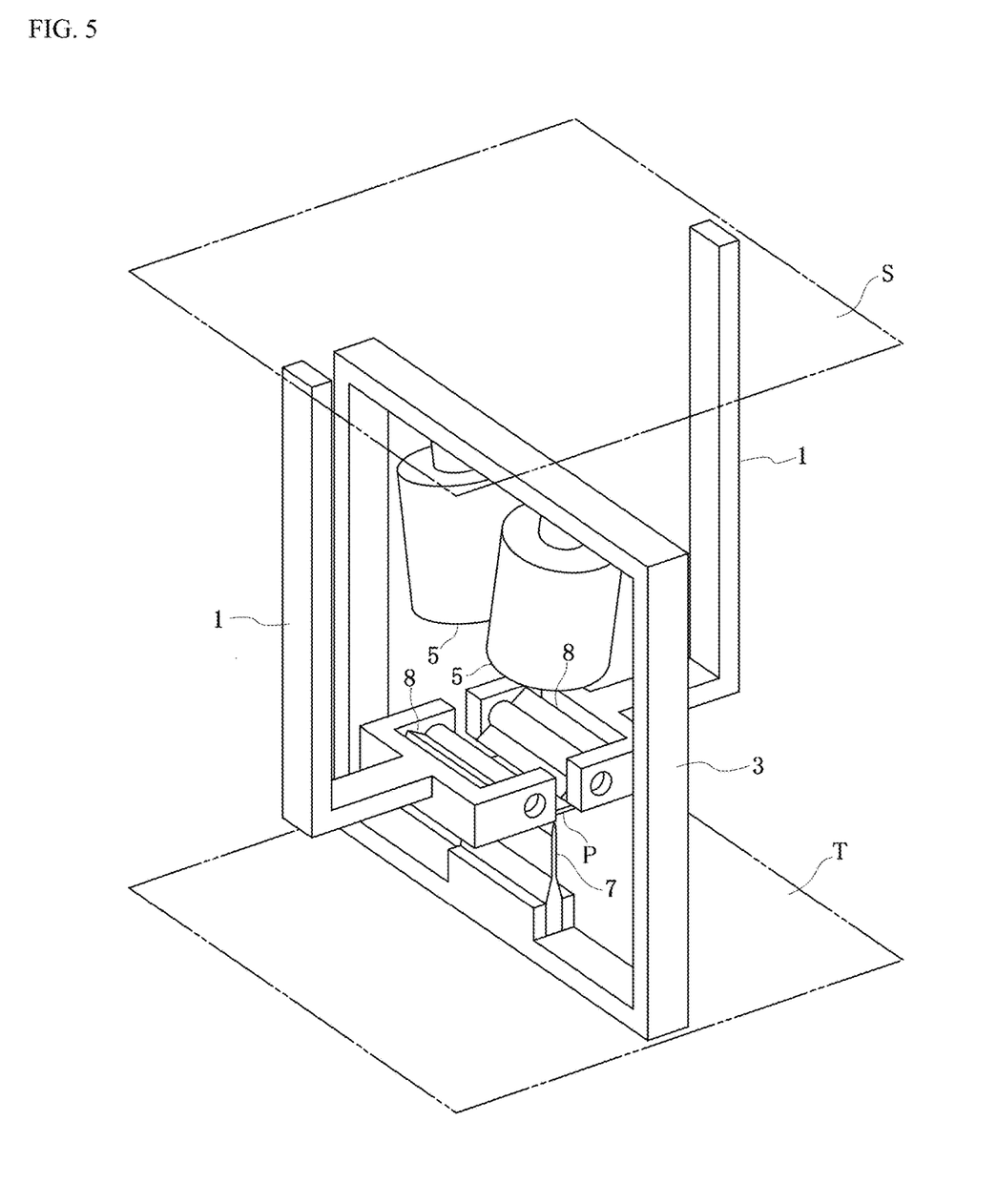
FIG. 5 is a perspective view showing another modification example of the bending test facility for a metal sheet material for an automobile body according to the embodiment shown in FIG. 2 and another modification example of the bending test method for a metal sheet material for an automobile body according to the embodiment shown in FIG. 2, which uses the bending test facility.

FIG. 5 is a perspective view showing another modification example of the bending test facility for a metal sheet material for an automobile body according to the embodiment shown in FIG. 2 and another modification example of the bending test method for a metal sheet material for an automobile body according to the embodiment shown in FIG. 2, which uses the bending test facility.

In a bending test facility for a metal sheet material for an automobile body according to this modification example, at least one of the two ordinary cylindrical rollers 6 in the bending test facility shown in FIG. 4, which is the modification example of the bending test facility according to the embodiment shown in FIG. 2, or two rollers 6 in an illustrated example are each replaced with a semicircular roller 8 having, while including a rotary shaft portion, a partially missing circular cross section as viewed from a rotary shaft direction thereof, and other components are configured similarly to those in the bending test facility shown in FIG. 4.

Furthermore, a bending test method for a metal sheet material for an automobile body according to this modification example includes, using the bending test facility according to the foregoing modification example, performing a bending test in which the slide S is displaced in such a direction as to approach the fixed table T of the above-described tester to cause the punch 7 to press a center between the above-described two supported portions of the test specimen P from the opposite side to the semicircular rollers 8, namely, upward from below in FIG. 5, so that the test specimen P is pressed into a gap between the two semicircular rollers 8 and bent at an acute angle to be deformed, and photographing a bending outside surface of the test specimen P during the bending test, which faces upward in FIG. 5, by use of the camera 5 from above through the gap between the two semicircular rollers 8 above the test specimen P.

According also to the bending test facility and the bending test method for a metal sheet material for an automobile body of such a modification example, during the bending test of the test specimen P, the bending outside surface of the test specimen P is photographed from the side of the semicircular rollers 8 by use of the camera 5 having a fixed relative positional relationship with the punch 7, and thus while, for example, the VDA 238-100 bending test is performed, a strain state of the bending outside surface of the test specimen P can be photographed without falling out of focus during the test. Since the punch 7 and the camera 5 are fixed to the fixed table T as the immovable portion, the punch 7 and the camera 5 can be made less affected by vibrations or the like caused by displacement of the slide S during the bending test, and work to install a fixing jig, wiring, and so on for the punch 7 and the camera 5 can be more facilitated. Moreover, it is possible to photograph, by use of the camera 5, the bending outside surface of the test specimen P from the side of the semicircular rollers 8 while securing a field of view and a luminosity through omitted parts of the semicircular rollers 8 and thus to obtain a clearer image.

Further, a bending performance evaluation method according to still another modification example of the embodiment of the present invention includes evaluating bending performance of the test specimen P by inputting, to an ordinary computer, a clearer image of the strain state of the bending outside surface of the test specimen P photographed from the side of the semicircular rollers 8 during the bending test of the test specimen P using the bending test method according to the modification example shown in FIG. 5 and by analyzing, with an evaluation program executed by the computer, such as the digital image correlation (MC), at least one of different types of information including a distribution of strain on a bending outside of the test specimen P, a change in the distribution, the occurrence and development of a crack thereon, and a distribution of cracks thereon. According to the bending performance evaluation method according to this modification example, it is possible to obtain, in addition to information related to a macro fracture phenomenon, information extremely useful in developing materials excellent in fracture resistance property, such as information on how strain develops into local fracture or information on critical fracture strain.

In the above-described bending test facilities according to the embodiments and modification examples of the present invention, instead of the two dies 2 shown in FIG. 1 and FIG. 3, for example, a single die having an opening at a center thereof may be used to support the two supported portions of the test specimen P in vicinities of both ends thereof. Furthermore, as the camera 5, for example, a single-lens reflex type film camera, a single-lens reflex type digital camera, or the like can be used, and the camera 5 is provided beforehand with a remote shutter so as to be capable of photographing at any timing. Further, in the bending test facilities according to the foregoing embodiments and modification examples, the number of cameras 5 used is determined depending on how the cameras 5 are used, i.e., for example, in a case where there are a large number of spots to be photographed or in a case where photographed images are to be subjected to three-dimensional DIC analysis, two cameras 5 are installed as shown in FIG. 1 to FIG. 5 or there is adopted a structure enabling the use of two or more cameras 5 Moreover, in consideration of a size of an image desired to be photographed or dimensions of a tester, preferably, a camera including a lens or an imaging device having a resolution as high as possible is used as the camera 5.

EXAMPLE

The bending test facility and the bending test method according to the modification example shown in FIG. 4 were used to perform a bending test pursuant to the VDA 238-100 standard and to photograph an image of a bending outside of the test specimen P during the bending test. As the test specimen P, there were used three types of materials A, B, and C of 50 mm square each obtained by shearing a sheet material formed of a high-strength steel sheet for an automobile body and then grinding an end face thereof. A distance between the two rollers 6 was set to a value given by a thickness of the test specimen P×2+0.5 mm, and a radius of a distal end of the punch 7 was set to 0.4 mm. In the above-described bending test, the test specimen P placed between the punch 7 and the rollers 6 was bent to be deformed by the rollers 6 fixed to the slide S as the movable portion of the tester and the punch 7 fixed to the fixed table T as the immovable portion of the tester. A punch speed was set to 5 mm/min. A load applied to the slide S and s stroke (a displacement amount) of the slide S during this process were measured to output a load-stroke curve. The above-described load-stroke curve was such that the load rose as soon as bending deformation started, at a given deformation stroke, fracture occurred at a location of the bending deformation and a maximum load was exhibited, and then the load was decreased. The above-described deformation stroke at which the maximum load was exhibited is defined as a fracture stroke.

In order to photograph a deformation state of the bending outside of the test specimen P and to subject an image thereof to the three-dimensional DIC analysis, the two single-lens reflex type cameras 5 were adjusted to be disposed at such respective positions that they were capable of photographing the bending outside of the test specimen P through between the two rollers 6 and were fixed to the fixed table T as the immovable portion of the tester. The bending test was started to start bending deformation, continuous photographing by use of the cameras 5 was started as soon as the load rose, and a photographing speed was set to one photograph per second. The above-described bending test was ended at appropriate timing after the load had been decreased due to the occurrence of fracture in the test specimen P.

Figure 6:
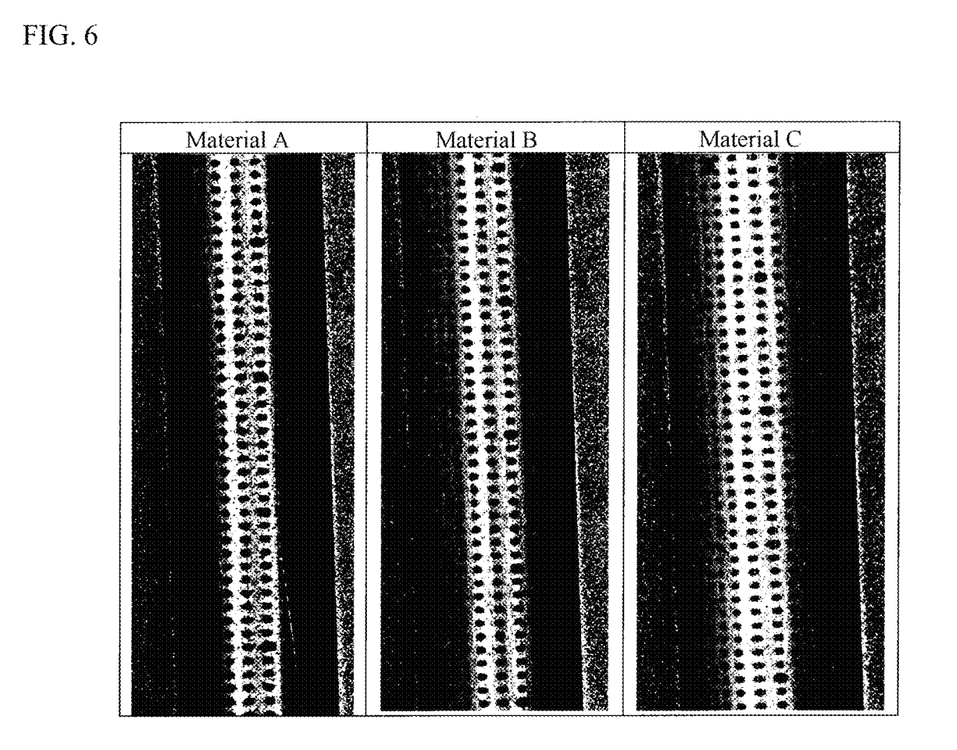
FIG. 6 is a photograph showing images of materials at the occurrence of fracture strain photographed in the bending test method for a metal sheet material for an automobile body according to the modification example shown in FIG. 4, which uses the bending test facility for a metal sheet material for an automobile body according to the modification example shown in FIG. 4.

After that, using the bending performance evaluation method according to the foregoing modification example, the three-dimensional DIC analysis was applied to a sequence of photographs taken by the above-described method to analyze an amount of strain on the bending outside of the test specimen P when strain in the test specimen P in a flat sheet state before the test was assumed to be 0, and an amount of strain on the bending outside of the test specimen P at the above-described fracture stroke was determined. The above-described amount of strain is defined as corresponding to fracture strain. FIG. 6 shows images obtained by photographing a strain state of each of the materials at the occurrence of fracture strain. Furthermore, Table 1 shows material properties of the materials, fracture strokes thereof, and fracture strain therein.

TABLE 1

| Material | Yield strength YS(MPa) | Tensile strength TS(MPa) | Elongation El (%) | Fracture stroke (mm) | Fracture strain |
|---|---|---|---|---|---|
| A | 683 | 980 | 17.5 | 10.5 | 0.286 |
| B | 668 | 1008 | 17.0 | 10.7 | 0.250 |
| C | 835 | 1007 | 12.6 | 10.9 | 0.321 |

As shown in Table 1, maximum fracture strain occurred in the material C in this example, and fracture strain varying with a type of the materials could be measured using the bending test facility and bending test method according to the foregoing modification example and the bending performance evaluation method according to the foregoing modification example. This means that a permissible amount of strain during bending deformation varies with a type of materials, and it was confirmed that a bendability evaluation of a material can be performed based on a difference in the above-described fracture strain.

While the foregoing description has been made with reference to the illustrated examples, the present invention is not limited to the above-described examples. For example, while in the foregoing working example, a high-strength steel sheet is used as a metal sheet to be tested, instead, an ordinary steel sheet or any other type of sheet material such as, for example, an aluminum sheet can also be used as the metal sheet to be tested.

Furthermore, while in the foregoing working example, the bending test facility and method according to the modification example shown in FIG. 4 are used to perform the bending test pursuant to the VDA 238-100 standard, instead, the bending test facility and the bending test, method according to any of the other embodiments and modification examples can also be used.

INDUSTRIAL APPLICABILITY

According, therefore, to the bending test facility and the bending test method for a metal sheet material for an automobile body of the present invention, two supported portions of a flat test specimen formed of the metal sheet material for an automobile body are supported with a supporting member, and a bending test is performed in which an area between the two supported portions of the test specimen is pressed by use of a punch from a side opposite to a side of the supporting member so that the test specimen is bent to be deformed, during which a bending outside surface of the test specimen is photographed from a side of the supporting member by use of a camera having a fixed relative positional relationship with the punch. Thus, a strain state of the bending outside surface of the test specimen can be photographed without falling out of focus during the test.

Further, according to the bending performance evaluation method of the present invention, bending performance of a test specimen is evaluated based on information on a distribution of strain on a bending outside of the test specimen, a change in the distribution, the occurrence and development of a crack thereon, and/or a distribution of cracks thereon obtained from an image of the bending outside of the test specimen photographed by use of the camera during the bending test using the bending test facility. Thus, it is possible to obtain, in addition to information related to a macro fracture phenomenon, information extremely useful in developing materials excellent in fracture resistance property, such as information on how strain develops into local fracture or information on critical fracture strain.

REFERENCE SIGNS LIST 1 support frame
2 die
3 connection frame
4 punch
5 camera
6 roller
7 punch
8 semicircular roller
P test specimen
S slide
T fixed table

The invention claimed is:

1. A bending test facility for a metal sheet material for an automobile body, comprising:
 a supporting member that supports two supported portions of a flat test specimen formed of the metal sheet material for an automobile body;
 a punch for performing a bending test in which an area between the two supported portions of the test specimen is pressed toward the supporting member so that the test specimen is bent to be deformed; and
 a camera for photographing a bending outside surface of the test specimen during the bending test using the punch,
 wherein the punch and the camera are fixed relative to each other such that relative positions of the punch and the camera remain fixed during an entirety of the bending test.

2. The bending test facility for a metal sheet material for an automobile body according to claim 1, further comprising:
 a tester that includes a movable portion and an immovable portion and advances or retracts the movable portion relative to the immovable portion,
 wherein the punch and the camera are installed in either one of the movable portion and the immovable portion, and the supporting member is installed in the other one of the movable portion and the immovable portion.

3. A bending performance evaluation method for a metal sheet material for an automobile body, comprising:
 during a bending test using the bending test facility for a metal sheet material for an automobile body according to claim 1, photographing an image of a bending outside of the test specimen by use of the camera;
 obtaining, from the image, information on a distribution of strain on the bending outside of the test specimen, a change in the distribution, occurrence and development of a crack thereon, and/or a distribution of cracks thereon; and
 evaluating bending performance of the test specimen based on the information.

4. The bending performance evaluation method for a metal sheet material for an automobile body according to claim 3, wherein
 in the bending test facility for a metal sheet material for an automobile body, the supporting member is formed of two rollers arranged in parallel and horizontally at a distance from each other.

5. The bending performance evaluation method for a metal sheet material for an automobile body according to claim 3, wherein
 in the bending test facility for a metal sheet material for an automobile body, the supporting member is formed of two rollers arranged in parallel and horizontally at a distance from each other, and at least one of the two rollers has, while including a rotary shaft portion, a partially missing circular cross section as viewed from a rotary shaft direction thereof.

6. The bending performance evaluation method for a metal sheet material for an automobile body according to claim 3, wherein
 the bending test facility for a metal sheet material for an automobile body further comprises a tester that includes a movable portion, and an immovable portion and advances or retracts the movable portion relative to the immovable portion, and wherein the punch and the camera are installed in the immovable portion, and the supporting member is installed in the movable portion.

7. The bending performance evaluation method for a metal sheet material for an automobile body according to claim 3, wherein
 the bending test facility for a metal sheet material for an automobile body further comprises a tester that includes a movable portion and an immovable portion and advances or retracts the movable portion relative to the immovable portion,
 wherein the punch and the camera are installed in the immovable portion, and the supporting member is formed of two rollers arranged in parallel and horizontally at a distance from each other, and is installed in the movable portion.

8. The bending performance evaluation method for a metal sheet material for an automobile body according to claim 3, wherein
 the bending test facility for a metal sheet material for an automobile body further comprises a tester that includes a movable portion and an immovable portion and advances or retracts the movable portion relative to the immovable portion,
 wherein the punch and the camera are installed in the immovable portion, and the supporting member is formed of two rollers arranged in parallel and horizontally at a distance from each other, at least one of the two rollers has, while including a rotary shaft portion, a partially missing circular cross section as viewed from a rotary shaft direction thereof, and is installed in the movable portion.

9. The bending test facility for a metal sheet material for an automobile body according to claim 1, wherein
 the supporting member is formed of two rollers arranged in parallel and horizontally at a distance from each other.

10. The bending test facility for a metal sheet material for an automobile body according to claim 9, further comprising:
 a tester that includes a movable portion and an immovable portion and advances or retracts the movable portion relative to the immovable portion,
 wherein the punch and the camera are installed in either one of the movable portion and the immovable portion, and the supporting member is installed in the other one of the movable portion and the immovable portion.

11. The bending test facility for a metal sheet material for an automobile body according to claim 9, wherein
 at least one of the two rollers has, while including a rotary shaft portion, a partially missing circular cross section as viewed from a rotary shaft direction thereof.

12. The bending test facility for a metal sheet material for an automobile body according to claim 11, further comprising:
   a tester that includes a movable portion and an immovable portion and advances or retracts the movable portion relative to the immovable portion,
   wherein the punch and the camera are installed in either one of the movable portion and the immovable portion, and the supporting member is installed in the other one of the movable portion and the immovable portion.

13. A bending test method for a metal sheet material for an automobile body, comprising:
   supporting, with a supporting member, two supported portions of a flat test specimen formed of the metal sheet material for an automobile body; and
   performing a bending test in which an area between the two supported portions of the test specimen is pressed by use of a punch toward the supporting member so that the test specimen is bent to be deformed,
   wherein during the bending test, a bending outside surface of the test specimen is photographed by use of a camera having a fixed relative positional relationship with the punch such that relative positions of the punch and the camera remain fixed during an entirety of the bending test.

14. The bending test method for a metal sheet material for an automobile body according to claim 13, wherein
   the punch and the camera are installed in either one of a movable portion and an immovable portion of a tester that advances or retracts the movable portion thereof relative to the immovable portion, and the supporting member is installed in the other one of the movable portion and the immovable portion.

15. The bending test method for a metal sheet material for an automobile body according to claim 13, wherein
   the supporting member is formed of two rollers arranged in parallel and horizontally at a distance from each other.

16. The bending test method for a metal sheet material for an automobile body according to claim 15, wherein
   the punch and the camera are installed in either one of a movable portion and an immovable portion of a tester that advances or retracts the movable portion thereof relative to the immovable portion, and the supporting member is installed in the other one of the movable portion and the immovable portion.

17. The bending test method for a metal sheet material for an automobile body according to claim 15, wherein
   at least one of the two rollers has, while including a rotary shaft portion, a partially missing circular cross section as viewed from a rotary shaft direction thereof.

18. The bending test method for a metal sheet material for an automobile body according to claim 17, wherein
   the punch and the camera are installed in either one of a movable portion and an immovable portion of a tester that advances or retracts the movable portion thereof relative to the immovable portion, and the supporting member is installed in the other one of the movable portion and the immovable portion.

\* \* \* \* \*